United States Patent
Sharma et al.

(10) Patent No.: US 10,317,649 B2
(45) Date of Patent: Jun. 11, 2019

(54) CAMERA ACTUATOR VIBRATION DAMPING

(71) Applicant: Apple Inc., Cupertino, CA (US)

(72) Inventors: Shashank Sharma, San Francisco, CA (US); Scott W. Miller, Los Gatos, CA (US); Alfred N. Mireault, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/685,953

(22) Filed: Aug. 24, 2017

(65) Prior Publication Data

US 2018/0059381 A1    Mar. 1, 2018

Related U.S. Application Data

(60) Provisional application No. 62/379,662, filed on Aug. 25, 2016.

(51) Int. Cl.
*H04N 5/225* (2006.01)
*H04N 5/232* (2006.01)
(Continued)

(52) U.S. Cl.
CPC .......... *G02B 13/0075* (2013.01); *G02B 7/09* (2013.01); *H04N 5/2254* (2013.01);
(Continued)

(58) Field of Classification Search
CPC .......... H04N 5/2254; G03B 2205/0023; G02B 13/0075; G02B 7/102; G02B 7/09; G02B 27/646; G02B 7/005
See application file for complete search history.

(56) References Cited

U.S. PATENT DOCUMENTS 7,271,511 B2   9/2007   Osaka
7,787,046 B2   8/2010   Nagasaki
(Continued)

FOREIGN PATENT DOCUMENTS

CN    1873513       12/2006
CN    204422843      6/2015
(Continued)

OTHER PUBLICATIONS

Office Action from Chinese Application No. ZL201721073903.8, (Chinese Version Only),(Apple Inc.), dated Aug. 22, 2018, pp. 1-6.

*Primary Examiner* — Kelly L Jerabek
(74) *Attorney, Agent, or Firm* — Robert C. Kowert; Meyertons, Hood, Kivlin, Kowert & Goetzel, P.C.

(57) ABSTRACT

A camera module includes an optical package, a camera actuator for moving the optical package, a camera subassembly, and one or more resilient members arranged within the camera subassembly to prevent, reduce, or cushion contact between the optical package and other components of the camera. The resilient members may be mounted on the lens carrier of the optical package and configured to come into resistive contact with components of the camera subassembly and/or mounted on components of the camera subassembly and configured to come into resistive contact with the optical package. In either case, the resistive cushioning provided by the resilient members may reduce or prevent contact (and an associated rattling noise associated with the contact) between the optical package and the hard components of the camera subassembly. The resilient members may be configured to cushion, but also allow hard stop contact. In embodiments bumpers (e.g., elastomeric pads) may be used.

20 Claims, 9 Drawing Sheets

(51) Int. Cl.
  *G02B 13/00*  (2006.01)
  *G02B 7/09*  (2006.01)
  *G03B 13/00*  (2006.01)
  *G02B 7/10*  (2006.01)

(52) U.S. Cl.
  CPC ....... *H04N 5/2257* (2013.01); *H04N 5/23287* (2013.01); *G02B 7/102* (2013.01); *G03B 2205/0023* (2013.01)

(56) References Cited

U.S. PATENT DOCUMENTS

| | | | |
|---|---|---|---|
| 8,611,735 | B2 | 12/2013 | Sekimoto |
| 9,554,023 | B2 * | 1/2017 | Park .................. H02K 41/0356 |
| 2008/0129830 | A1 | 6/2008 | Inoue et al. |
| 2011/0279916 | A1 * | 11/2011 | Brown .................. F03G 7/065 359/823 |
| 2012/0075519 | A1 | 3/2012 | Blasch |
| 2014/0043496 | A1 * | 2/2014 | Azuma ................ H04N 5/2254 348/208.7 |
| 2015/0296143 | A1 * | 10/2015 | Kang ................ H04N 5/23287 348/208.11 |
| 2015/0350499 | A1 * | 12/2015 | Topliss ................ H04N 5/2253 348/373 |
| 2016/0014339 | A1 * | 1/2016 | Miller ................ H04N 5/23248 348/208.6 |
| 2017/0150022 | A1 * | 5/2017 | Shigemitsu .............. G02B 7/04 |

FOREIGN PATENT DOCUMENTS

| | | |
|---|---|---|
| CN | 104836941 | 8/2015 |
| CN | 104902149 | 9/2015 |
| CN | 105301871 | 2/2016 |
| CN | 105899990 | 8/2016 |

* cited by examiner

CAMERA ACTUATOR VIBRATION DAMPING

This application claims benefit of priority of U.S. Provisional Application Ser. No. 62/379,662 titled "Camera Actuator Acoustic Mitigator" filed Aug. 25, 2016, the content of which is incorporated by reference herein in its entirety.

BACKGROUND

Technical Field

This disclosure relates generally to position control and more specifically to managing the motion of camera components.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera. In some embodiments, the autofocus mechanism may be configured to operate solely along the Z axis.

In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation/ disturbance by adjusting location of the optical lens on the X and/or Y axis in an attempt to compensate for unwanted motion of the lens.

In some instances, the movement of the optical package (intentional or otherwise) may cause the optical package to come into contact with other components of the camera and may cause undesirable acoustic noise.

Multi-function devices continue to become thinner, reducing the amount of foam and damping that can be used.

SUMMARY OF EMBODIMENTS

In some embodiments, a camera module includes an optical package, a camera actuator for moving the optical package, a camera subassembly, and one or more resilient members placed within the camera module to cushion or prevent contact between the camera subassembly and the optical package. In some embodiments, the resilient member includes a damping feature that dampens oscillations associated with the resilient members.

Figure 1A:
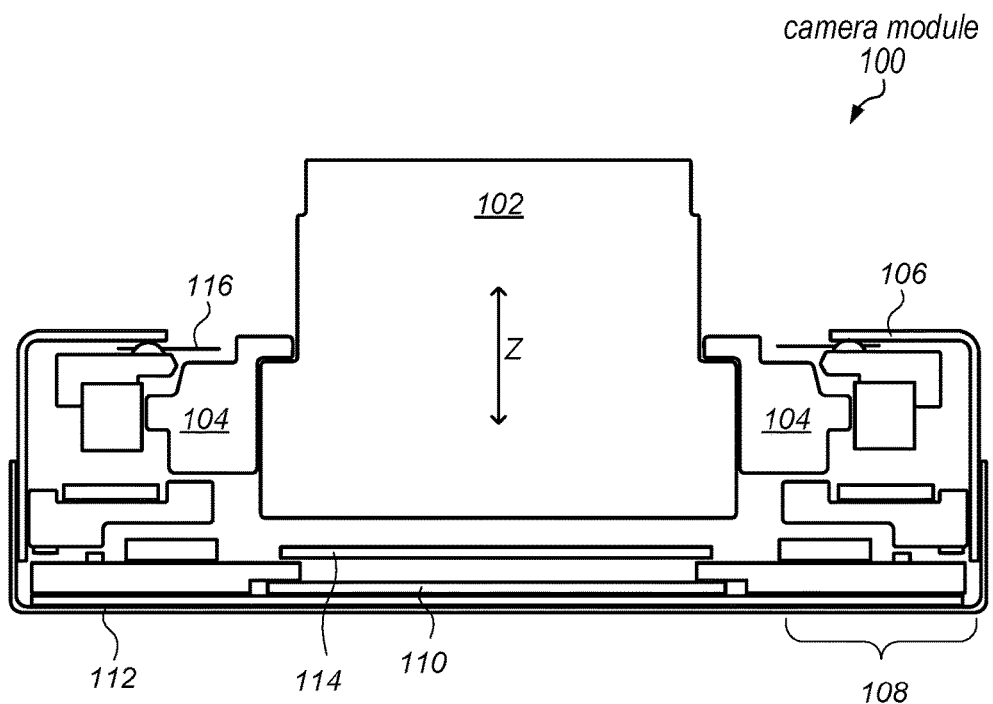
FIG. 1A illustrates an example embodiment of a camera module having an actuator module or assembly for autofocus mechanisms in small form factor cameras, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to"

language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value. These terms are only used to distinguish one element from another. The first value and the second value are both values, but they are not the same value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction to Spring-Based Resilient Members for Damping Vibrations within Miniature Autofocus Cameras Some embodiments include camera equipment outfitted with controls, magnets, and sensors to improve the position accuracy of a miniature actuation mechanism for a compact camera module. More specifically, in some embodiments, compact camera modules include actuators to deliver functions such as autofocus (AF) and optical image stabilization (OIS) (e.g., 119 in FIG. 2A). One approach to delivering a very compact actuator for OIS is to use a Voice Coil Motor (VCM) arrangement. In this preferred arrangement, plural magnets are bonded to the moving body of the OIS actuator. For size and efficiency reason, these magnets are also used as part of the AF actuator housed inside the moving body of the OIS actuator. An arrangement of coils is mounted on the fixed body of the OIS actuator, along with an arrangement of Hall sensors. Optical image stabilization is an optional feature, in embodiments.

In embodiments, a camera, sometimes referred to a camera module herein, includes an optical package, and one or more camera actuators for moving the optical package with respect to a camera subassembly that houses the optical package. A camera module may or may not include an image sensor, in embodiments. An optical package may include one or more lenses, and a lens carrier, in embodiments. The lens carrier may include one or more magnets and/or coils for actuating movement of the optical package with respect to the camera subassembly. The optical package 102 may be moveably connected to the camera subassembly. Generally, the optical package is moveable within the camera module by actuators for purposes such as autofocus, for example.

In some embodiments, a camera subassembly may include a base, a yoke, and a camera cover can. The actuator(s) may or may not be considered part of the camera subassembly, in embodiments. A camera subassembly may include more, less or some other different combination of components, in embodiments. In some embodiments, the camera actuator moves a lens carrier that is part of the optical package. In some embodiments, a camera actuator assembly includes one or more magnets and one or more coils for moving an optical package. The camera may also include one or more springs placed within the camera to reduce or prevent contact between components of the camera cover and the optical package.

For instance, a thin "leaf-type" spring may be configured to come into contact with and place resistive pressure in the optical package as the optical package moves toward various end stops that define the amount of travel of the optical package. The spring may be configured to prevent or reduce the likelihood of the optical package coming into contact with the end stops, thus reducing or eliminating vibrations that cause an acoustic noise. For example, Application of certain forces to the device may cause movement of the optical package within the camera module which may result in acoustic noise when the optical package contacts other components. Bumpers (e.g., elastomer or other material) may also be used to prevent or reduce the likelihood of the optical package coming into contact with the end stops, thus reducing or eliminating vibrations, in embodiments.

One solution is to place a cushioning material at the end stops such that when the optical package reaches the end stops, the cushioning material absorbs the contact, reducing or preventing the acoustic noise entirely. But, various processes, such as manufacturing and calibration processes rely upon placing the optical package against the end stops such that a hard stop is achieved. Hard materials, instead of cushioning materials are preferred at this contact point for such processes. Use of a cushioning material at this point may hinder the manufacturing or calibration process, when a hard stop cannot be achieved.

In some embodiments, the spring(s) (sometimes referred to as resilient members, herein) are configured to provide a cushioning action that reduces vibrations associated the optical package coming into contact with end stops of the camera. End stops may define a range of motion of the optical package with respect to other components of the camera module. For instance, end stops may be formed as part of the camera base or can cover, as part of the actuator (e.g., formed into one of the magnet holders of the actuator or the like) or as part of any other components of the camera or as an end stop component.

The motion controlling spring may be formed from, as part of, or in conjunction with other components of the camera. For example, the motion controlling spring may be formed from formations of a main spring that more generally provides suspension of the optical package among the other components of the camera module.

A vibration damping component may be added to the spring(s). For example, the camera module may be formed with a damping gel placed in relationship to the spring(s).

In some embodiments, instead of, or in addition to the spring-based motion control components, the camera module may include one or more bumper(s) (sometimes referred to as resilient members, herein) that provide a cushioning action that reduce vibrations associated the optical package coming into contact with end stops of the camera. The resilient members may include other configurations or materials than the springs and bumpers described herein without departing from the scope of this disclosure. An example characteristic of a resilient member is an increase in resistance in a direction once engaged, but a return to an original position when contact has ceased, in embodiments.

Multifunction Device Examples

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

FIG. 1A illustrates an example embodiment of a camera module having an actuator module or assembly for an autofocus mechanism in small form factor camera module 100, according to at least some embodiments. The camera module 100 is illustrated with optical package 102. The optical package 102 may include a lens carrier 104 that is configured to rely upon actuator(s) 108 that move the optical package in at least the Z direction. In some embodiments, the lens carrier 104 may include one or more coils that interact with magnets to orient the optical package 102. In some embodiments, the lens carrier may be considered as separate from the optical package.

The optical package 102 may be housed within a camera module subassembly. For example, the optical package may be suspended on a spring-based suspension assembly within a camera subassembly that includes can cover 106, and base 112. In some embodiments, the camera module may include one or more filters 114 and an image sensor 110. Generally, the actuators 102 are controlled by instructions that direct the actuators move the optical package 102 in the Z direction with respect to the image sensor 110. Such movement may be used to focus the camera, for instance.

Figure 1B:
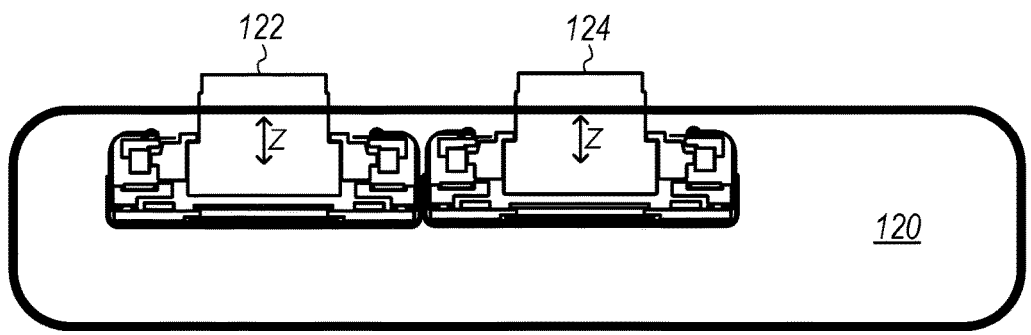
FIG. 1B illustrates an example embodiment of a dual-camera device that includes two camera modules.

Combinations of embodiments disclosed herein may include devices with more than one camera module. For example, FIG. 1B illustrates an example embodiment of a dual-camera device 120 that includes two camera modules. In at least some embodiments, a device may include camera modules with optical packages that are each configured for a different focal length than the optical packages of the other camera modules of the device. One optical package may be configured as wide-angle and another as telephoto, in embodiments.

Devices are contemplated with any number of camera modules, in some embodiments. Although camera module 122 and 124 are illustrated with the same architecture. One or more of the camera modules may incorporate features that are different from the features of the other camera module of the device. For instance, a feature that damps vibrations within one of the camera modules may be of a different architecture or material or configuration than a feature that damps vibrations in a different camera module of the device. In some embodiments, spring-based resilient members may be used to damp vibrations in one camera module while bumpers may be used to damp vibrations in another camera module. Other arrangement of these and similar vibration damping features may be mixed and matched in a device, in embodiments.

In some embodiments, features to damp vibrations may be applied to devices with more than one camera module. For instance, a dual camera device may be configured with vibration damping features similar to those described herein. In embodiments, distinct ones of the camera modules may use distinct types of vibration damping members. For instance, one camera module of a multi-camera device may be configured with spring-based resilient members, and another camera module of the multi-camera device may be configured with bumper-type vibration dampers. In some embodiments, one or more of the camera modules of a multi-camera device may be configured with only one type of vibration damping feature while another camera module of the multi-camera device may be configured with more than one type of vibration damping feature.

FIG. 1A illustrates a leaf spring 116 mounted between a camera cover can and a magnet holder. But, it is contemplated that these and other similar types of vibration dampers may be placed or arranged otherwise for a device. FIGS. 4A-4F, and 5A-5D provide non-exhaustive examples of different types of example vibration dampers that are arranged at different locations of a device. Other configurations are also contemplated. For instance, it is contemplated that a camera module may be configured with one type of vibration damper such as a leaf spring to control movement of an optical package in one direction (e.g., as illustrated in FIG. 1A) while that same camera module may be configured with another type of vibration damper such as a bumper-type damper for controlling movement of that same optical package in another direction (e.g., as illustrated in FIGS. 4C-4F). As illustrated in FIGS. 2C-2F, leaf-spring type vibration dampers may put the mechanism for controlling movement and/or preventing contact away from where the undesirable contact happens, in embodiments. Bumpers, in some embodiments, locate the vibration damper in-between the location where the undesirable content happens.

Figure 2A:
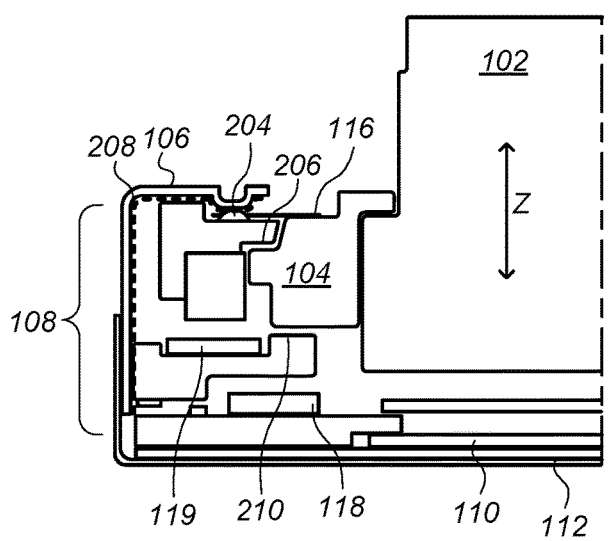
FIG. 2A depicts an example embodiment of a spring-based resilient member of the camera module that may, for example, be used to provide vibration damping for an autofocus mechanisms in small form factor cameras, according to at least some embodiments.

FIG. 2A depicts an example embodiment of a spring-based resilient member of the camera module that may, for example, be used to provide vibration damping for an autofocus mechanism in small form factor cameras, according to at least some embodiments. FIG. 2A illustrates a leaf spring 116. In embodiments, the spring 116 is attached to the camera module and configured such that the spring 116 cushions movement of the optical package 102 with respect to the camera subassembly.

Lens carrier 104 of the optical package 102 is illustrated in FIG. 2A with end stops 206 and 210. Actuator assembly 108 is configured to move the optical package 102 in the z direction in a stroke that includes an operational range between a +Z end stop 206 and −Z end stop 210. In some embodiments, the operational range may be a portion of the stroke between the +Z end stop 206 and the −Z end stop 210. For instance, the operational range may be a central portion of the stroke between the +Z end stop 206 and the −Z end stop 210.

In embodiments, the spring 116 may be arranged to cushion the optical package 102 as the optical package 102 passes out of the operation range and approaches one of the end stops 206, 210. The operational range may be the range of movement encountered by the optical package during regular use (e.g., such as during autofocus operations). Generally, an operational range is a subset of the range between the maximum movement of the optical package (e.g., −Z and +Z end stops are maximums, in embodiments).

The optical package may be pushed out of the operational range, in some circumstances. For instance, manufacturing processes (e.g., lens attach, calibration, etc.) may require pushing the optical package fully against an end stop (e.g., the −Z end stop 210). The spring 116 may be mounted and arranged to not engage within the operational range, in embodiments. For instance, FIG. 1A illustrates the optical package 102 in a central portion (e.g., operational area) of the stroke and the spring 116 is not engaged. FIG. 2A illustrates the optical package 102 towards the end of the operational range (or in some embodiments, outside the operational range) where the spring 116 has started to engage with the lens carrier 104 of the optical package. In some embodiments, the spring 116 may be arranged to engage with the optical package without engaging the lens carrier 104. In some embodiments, the spring (or resilient member) may engage near—to the end of the operational range. The engagement may happen in an area partially overlapping with both the operational range and outside the operational range, in some embodiments.

FIG. 2A depicts insulation 208 on the camera cover can 106 that insulates the cover can 106 from coming into contact with the spring 116. The insulation may prevent shorting events, in some embodiments. FIG. 2A also depicts a damping gel 204 that is configured to interact with the spring 116 and cause damping of oscillation of the spring 116. The damping gel 204, or other damping mechanism may be placed in various positions within the camera module without departing from the scope of this disclosure. The camera module may include various sensors (e.g., Hall effect sensors) for providing feedback on the position of the actuator and optical package with respect to the base 112.

FIG. 2A illustrates an embodiment of an example actuator assembly 108 in which embodiments as described herein may be applied. An actuator assembly 108 may include position sensors and magnets, in embodiments. As one of skill in the art will readily ascertain in light of having read the included disclosure, a wide variety of configurations of position sensors and magnets fulfill differing design goals in different embodiments without departing from the scope and intent of the present disclosure. For example, while at least some of the embodiments shown herein reflect voice coil motor actuators, one of skill in the art will readily understand that different actuators, including non-magnetic motorized actuators such as rotary motors or piezo-electric actuators, can be used with embodiments without departing from the scope and intent of the present disclosure.

Figure 2B:
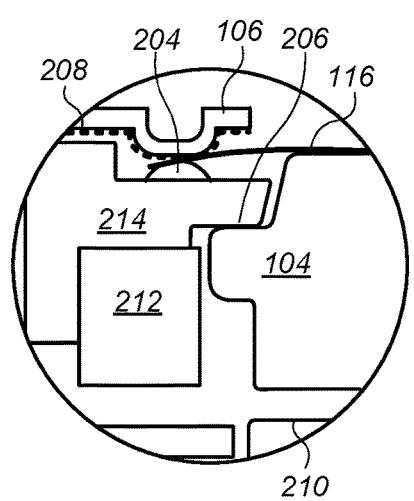
FIGS. 2B-2F illustrate enlarged images of movement associated with an embodiment of a spring-based resilient member of the camera module that may, for example, be used to provide vibration damping for autofocus mechanisms in small form factor cameras, according to at least some embodiments.
Figure 2C:
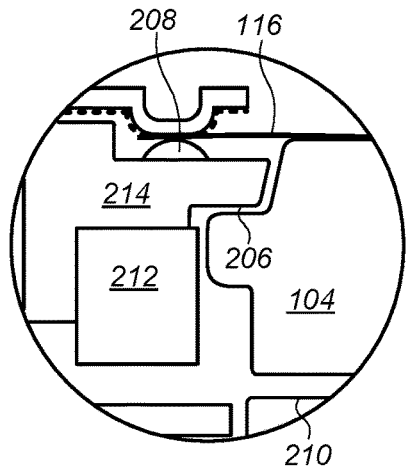
Figure 2D:
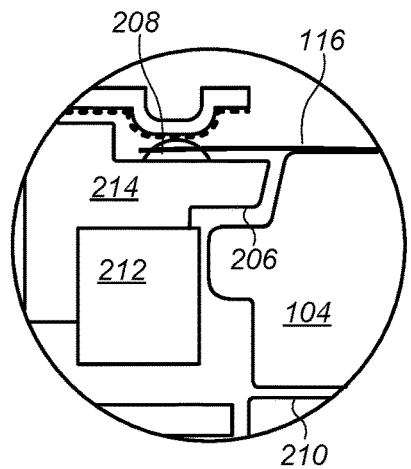
Figure 2E:
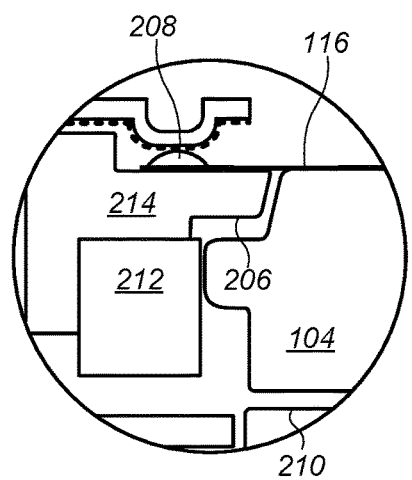
Figure 2F:
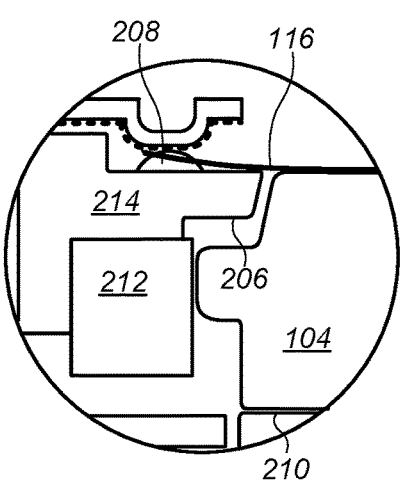
Figure 2G:
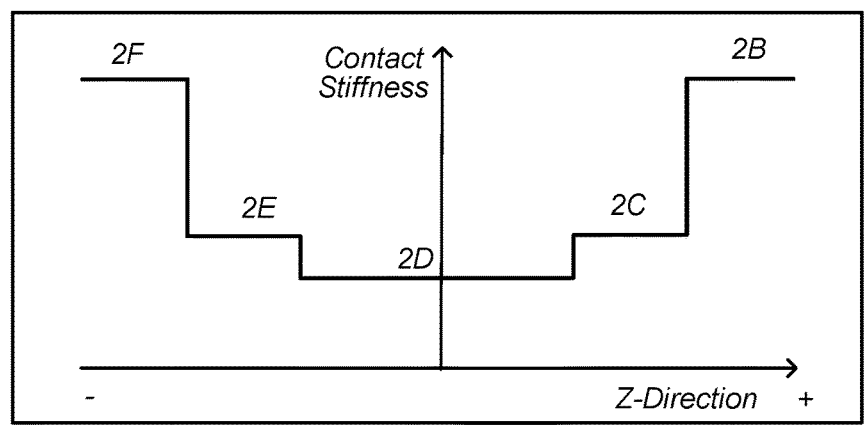
FIG. 2G illustrates a graph depicting various levels of stiffness for a spring-based resilient member of an autofocus mechanism that is moving through a range of motion, in accordance with some embodiments.

FIGS. 2B-2F illustrate enlarged images of components of the camera module at various stages of movement associated with an embodiment of a spring-based resilient member of the camera module, according to at least some embodiments. In the depicted embodiments, spring 116 is mounted to the lens carrier 104 of the optical package 102. As the lens carrier 104 traverse in the Z direction, the end of the spring 116 that is not connected to the carrier interacts with the camera cover can 106, damping gel 208 and/or the magnet holder 214, at various points along the travel direction. Generally, FIGS. 2B-2F illustrate movement of the optical package 102 from a +Z end stop (FIG. 2B) through a central range and to a −Z end stop (FIG. 2F). FIG. 2G illustrates a comparison of the contact stiffness involved with the movement throughout the range of motion. In embodiments, the spring 11 may be configured with enough stiffness to prevent contact between the optical package 102 and the hard stops during tap events, but also with enough flexibility to allow the optical package to be pushed past the operational range of motion and to engage the hard stops (e.g., for manufacturing processes such as lens attach, calibration, parking operation, drops etc.).

In FIG. 2B, lens carrier 104 of the optical package 102 is illustrated at full hard stop against the +Z end stop 206 formed with a magnet holder 214 (illustrated holding magnet 212) of the actuator assembly 108. As illustrated, in this position the spring 116 is exerting the greatest amount of stiffness against the lens carrier 104 of the optical package 102. FIG. 2G illustrates that the context stiffness is the greatest at this position, as well as at the other end stop position illustrated in FIG. 2E, described below. In at least some embodiments, the spring 116 may be configured to gradually decelerate the optical package 102 as the optical package approaches the +Z end stop 206. The gradual deceleration may reduce or eliminate an acoustic noise associated with the optical package coming into contact with hard pieces of the camera module, such as end stops (e.g., +Z end stop 206 of the magnet holder 214 and −Z end stop 210). FIG. 2B illustrates the damping gel 204 interacts with the spring 116 during spring engagement. The damping gel 204 dampens oscillations associated with the spring, whether the spring 116 is engaged or not, in embodiments.

FIG. 2C illustrates the lens carrier 104 of the optical package in a position slightly away from the +Z end stop 206 and closer to −Z end stop 210, compared to the position depicted in FIG. 2B. In this position, the force exerted by the spring 116 is less than the force exerted by the spring when the optical package 102 is closer to the +Z end stop as illustrated in FIG. 2B, but greater than the force exerted by the spring when the spring is not engaged, as illustrated in FIG. 2D.

FIG. 2D illustrates the optical package in a central portion of the operational range of the optical package. Spring 116 is depicted exerting little to no force on either the camera cover can 106 or the magnet holder 214. FIG. 2E illustrates the optical package 102 towards the −Z direction of travel. FIG. 2G illustrates a moderate contact stiffness associated with this position. FIG. 2F illustrates the optical package 102 fully-engaged with −Z end stop 210. FIG. 2G illustrates the greatest amount of contact stiffness is associated with this position. As depicted in FIGS. 2B-2G, the contact stiffness of the spring starts at engagement with the lens carrier 104 of the optical package and increases as the lens carrier 104 approaches the end stops. The spring 116 does not prevent full stop engagement between the lens carrier 104 and the end stops 206, 210, in embodiments. It is contemplated that other various numbers and/or arrangements of individual springs 116 may be useful, in embodiments. Mounting and contact points between the spring and components of the camera module may vary, in embodiments, without departing from the scope of this disclosure, FIG. 2G illustrates a graph depicting various levels of stiffness for a spring-based resilient member of an autofocus mechanism that is moving through a range of motion (depicted in FIGS. 2B-2F, described above), in accordance with some embodiments. A resilient member may be designed with a certain stiffness. For instance, a resilient member may be designed with sufficient stiffness to cushion the movement of the optical package when a force less than a threshold is applied to the optical package. For instance, a threshold force may correspond to the force associated with a user tap event (e.g., a user tapping on the screen to interact with the user interface) or correspond to a drop event (e.g., when a user drops a smartphone). The same or another resilient member may be designed with a certain amount of flexibility. For instance, the resilient member may be designed to allow the optical package to pass past the resilient member and engage hard stops (e.g., during manufacture such as lens-attach, during a park mode, or during calibration, etc.). The threshold associated with the stiffness may be the same or different from the threshold associated with the flexibility, in embodiments. For instance, there may be an operational range of the resilient member between the stiffness threshold associated with cushioning and the flexibility threshold that allows engagement with the end stops.

Figure 3A:
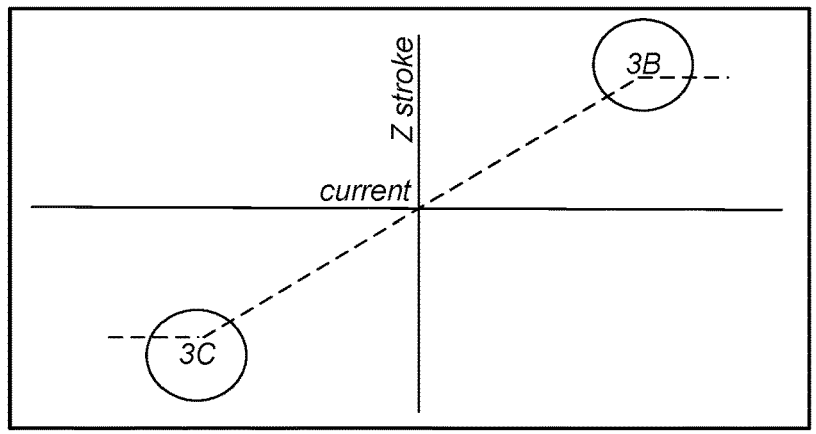
FIGS. 3A/3B/3C illustrates various amounts of cushion associated with various configurations of a spring-based resilient member of a portable multifunction device having a camera, in accordance with some embodiments.

FIGS. 3A/3B/3C illustrate various amounts of cushion associated with various configurations of a spring-based resilient member of a portable multifunction device having a camera, in accordance with some embodiments. In particular, FIG. 3A depicts the position of the optical package 102 along the Z stroke as current is applied to the actuator(s) 108. When a positive signal is generated, the optical package is driven in the positive Z stroke direction. When a negative signal is generated, the optical package is driven in the negative z stroke direction.

Figure 3B:
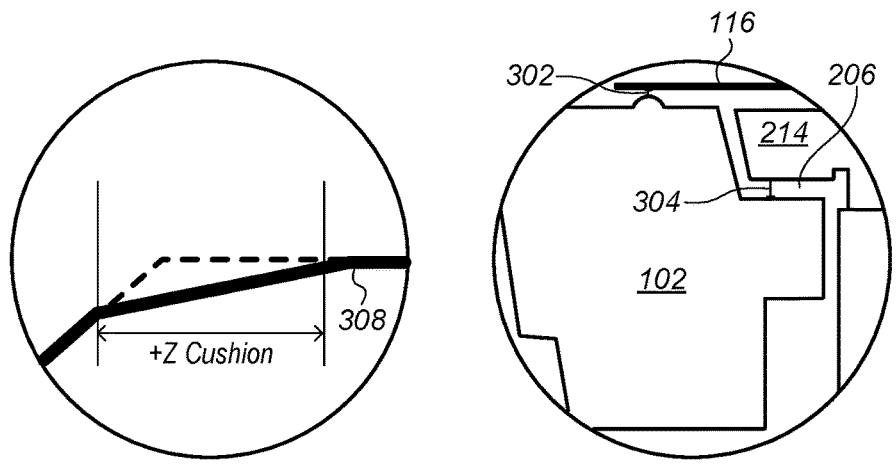
Figure 5A:
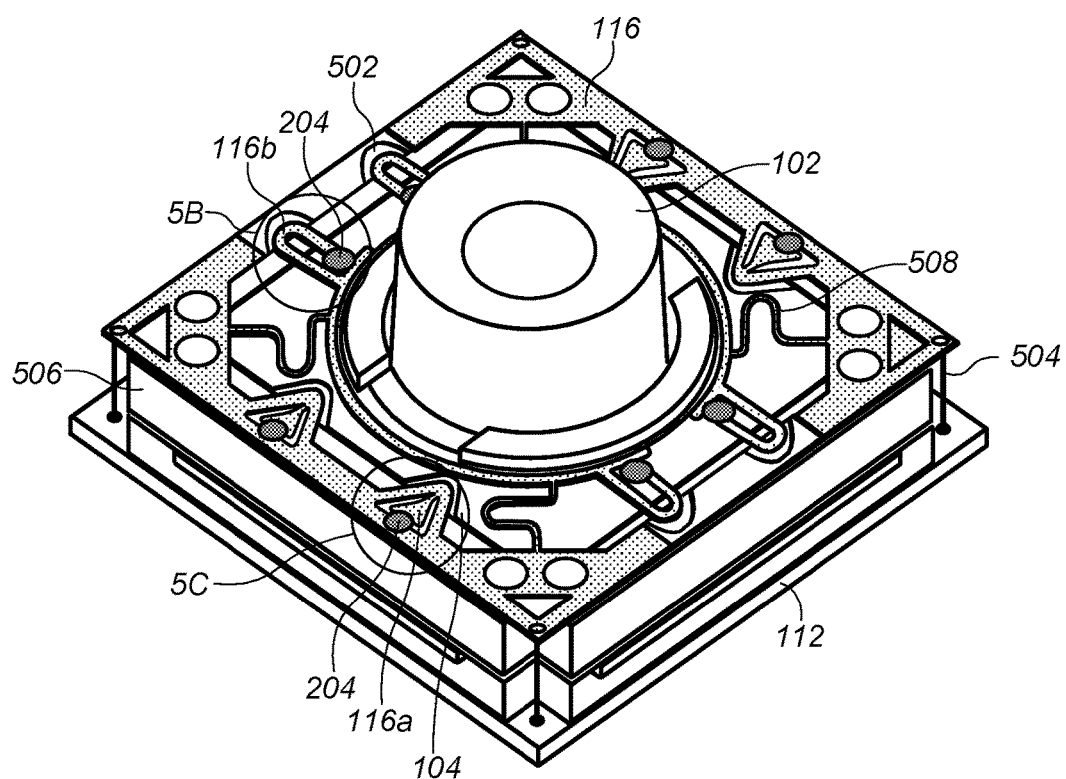
FIG. 5A illustrates an isometric view of a suspension system of a camera module that includes spring-based resilient members of an autofocus mechanism, in some embodiments.

The spring 116 may be attached any of a number of different components of the camera module, in embodiments. In the embodiment depicted in FIG. 3B the spring 116 is attached to the magnet holder 214 and the cushion distance to the stop at 302 is less than the +Z stroke distance 304. This is also illustrated in FIG. 5A at spring 116a and lens carrier 104. (With such a configuration, the spring 116 is engaged by the optical package 102 before the optical package reaches the +Z end stop 206. FIG. 3B illustrates that the addition of the spring 116 reduces the distance of travel of the optical package for similar amounts of electrical force. FIG. 3B illustrates that a zone of cushioning is introduced to this portion of the Z-stroke.

Figure 3C:
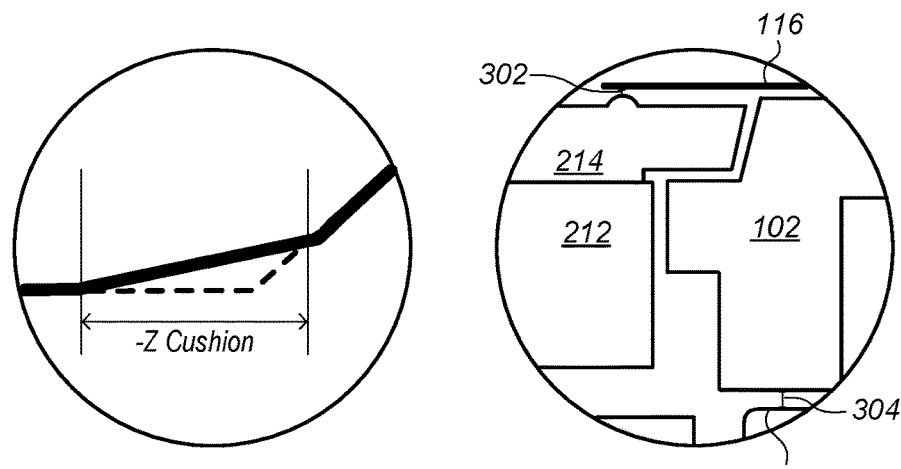

In the embodiment depicted in FIG. 3C the spring 116 is attached to the optical package 102 and the cushion distance 302 to the stop is less than the −Z stroke distance 304. This arrangement is also illustrated in FIG. 5A, (magnet holder 214, spring tab 116b). With such a configuration, the spring 116 is engaged by the magnet holder 214 before the optical package reaches the −Z end stop 210. FIG. 3C illustrates that the addition of the spring 116 reduces the distance of travel of the optical package for similar amounts of electrical force. FIG. 3C illustrates that a zone of cushioning is introduced to this portion of the Z-stroke. FIGS. 3A-3C illustrate that the spring 116 may be configured to reduce or eliminate acoustic noises (e.g., rattling) that is induced by the movement of the optical package at the behest of the actuators. In some embodiments, the spring 116 may be configured to reduce or eliminate acoustic noises that are induced by user movement of the camera (e.g., via the user shaking or tapping the multifunction device that includes the camera).

Bumpers

FIGS. 4A-4F illustrate various configurations of cushioning bumpers (sometimes referred to herein as resilient members) that, for example, may be used to dampen vibration or absorb impacts associated with the autofocus mechanism in small form factor cameras, according to at least some embodiments. In preferred embodiments, the spring-based resilient members described above and the bumpers disclosed herein are alternative embodiments. However, they may be used together in some embodiments.

Figure 4A:
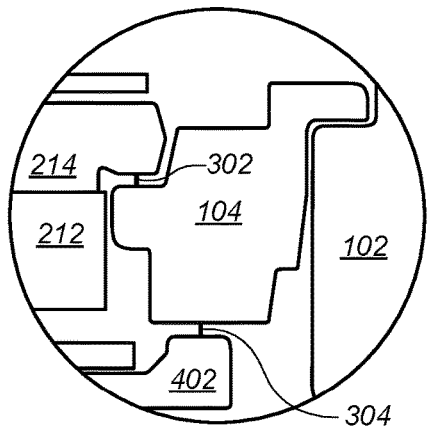
FIGS. 4A-4F illustrate various configurations of cushioning bumper-based resilient members that, for example, may be used to dampen vibration or absorb impacts associated with the autofocus mechanism in small form factor cameras, according to at least some embodiments.

FIG. 4A illustrates a distance 302 associated with the +Z end stop and another distance 304 associated with a −Z end stop for camera component 402. The distance 302 increases and distance 304 decreases in conjunction with movement of the lens carrier of the optical package 102 with respect to the magnet holder 214 and camera component 402.

Figure 4B:
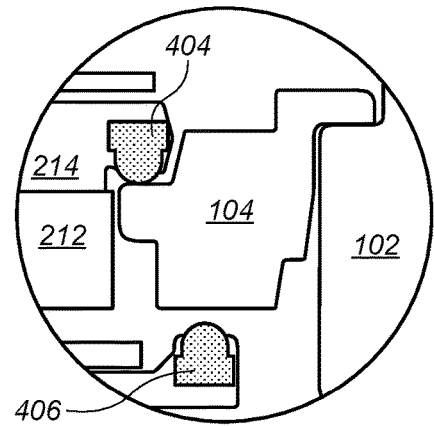

FIG. 4b illustrates bumpers 404 and 406 that are configured as part of the magnet holder 214 and camera component 402. In some embodiments, the bumpers 404/406 are elastomeric bumpers. The bumpers 404/406 may be arranged at the bottom (and top) of the Z stroke to cushion the AF unit during tap events, for example. The bumpers may be formed in such a way as to deforms out of the way and to allow engagement of the optical package 102 with stiff primary hard stops (e.g., during drops and manufacturing processes such as lens attach). In some embodiments, the bumper by itself could be over molded on to the plastic components. In some embodiments, the bumper could be made separately (e.g., molded or die cut) and then affixed (e.g., glued) to the hard (e.g., plastic) components.

Figure 4C:
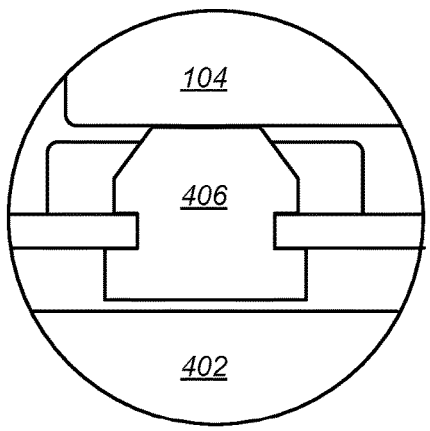
Figure 4D:
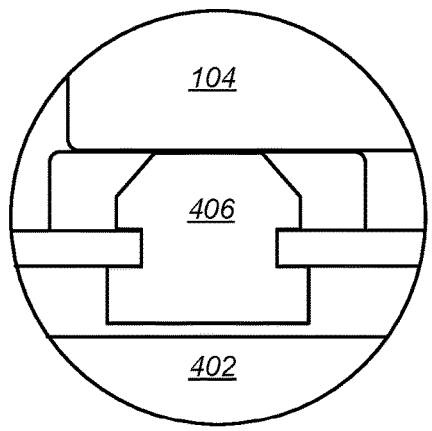

For instance, FIG. 4C illustrates that the lens carrier 104 of the optical package 102 engages the bumper 406 prior to the lens carrier 104 reaching the hard stop. FIG. 4D illustrates the bumper 406 deforming out of the way and allowing the lens carrier to come into full hard contact at the hard stop.

The bumpers may be arranged in any of a number of configurations, for example several bumpers of varying height may be used together such that a first bumper is engaged and a second bumper is engaged subsequent to the first engagement, thereby providing additional resistance as the first bumper is compressed.

Figure 4E:
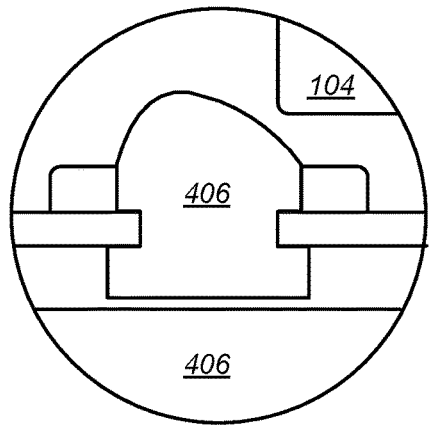
Figure 4F:
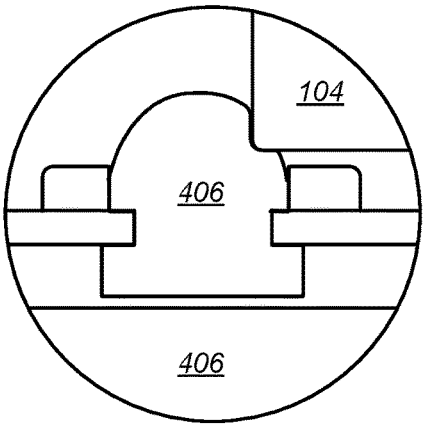

FIGS. 4E and 4F illustrate that the bumpers may be configured asymmetrically. Asymmetric bumpers may be used to cushion movement in more than one direction, for example. In FIG. 4E, asymmetric bumper 406 is configured to cushion movement of the lens carrier 104 in the Z direction as well as in another direction (e.g., the x or y direction). FIG. 4F depicts that the lens carrier is contacting the bumper 406 in such a manner that the lens carrier is cushioned in at least two different directions.

In some embodiments, a combination of one or more bumpers and one or more springs may be used, to cushion motion in various respective directions, for example. Additionally, the bumpers and the springs may be used in multiples such that additional members are engaged as the optical package continues past engagement with an initial member.

FIG. 5A illustrates an isometric view of a suspension system of a camera module that includes spring-based resilient members of an autofocus mechanism, in some embodiments. FIG. 5A illustrates an example placement of a spring 116 (with spring tabs 116a and 116b) with respect to a yoke 506 and the optical package 102. In embodiments, the optical package is suspended among the yoke 506 via arms 508 of spring 116. The spring-based suspension system may be configured with flexible arms 508 that allow the optical package to move through an operation range (e.g. in the Z orientation) with respect to the yoke 506. The flexible arms 508 may be configured to allow for movement of the optical package in other directions as well (e.g., X and Y directions).

Spring 116, mounted to both yoke 506 and lens carrier 104, is illustrated with spring tab 116a that is mounted on the yoke 506 and cushions movement of the optical package 102 in the +Z direction, and spring tab 116b that is mounted on the optical package 102 and cushions movement of the optical package 102 in the −Z direction. FIG. 5A illustrates use of recesses 502 with the spring tabs; the recess 502 may provide for travel within the operating range without engaging the springs. Recesses may be provided for spring tab 116a, in embodiments (not illustrated).

Spring tab 116a of FIG. 5A illustrates a cantilever-type spring tab mounted to the yoke. In embodiments, when spring tab 116a is engaged by the lens carrier 104, the portion of the spring tab 116a making contact with the lens carrier moves with the direction of the lens carrier 104, while the other "end" of the spring tab 116a (the other end depicted as engaging the damping get 204) moves in the opposite direction during engagement with the damping gel 204 that dampens the movement. Spring tab 116b of FIG. 5A illustrates a multi-arm spring tab mounted to the lens carrier 104 of the optical package 102. In embodiments, damping gel 204 may be placed to interact with one or more of the arms of the spring tab 116b, to dampen oscillating movement, for example. In embodiments where only one arm of the spring tab 116b is attached to the mounting point on the lens carrier, the damping gel 204 may be placed in the gap between one of the arms and the mounting point of the spring 116 to the lens carrier 104.

Figure 5B:
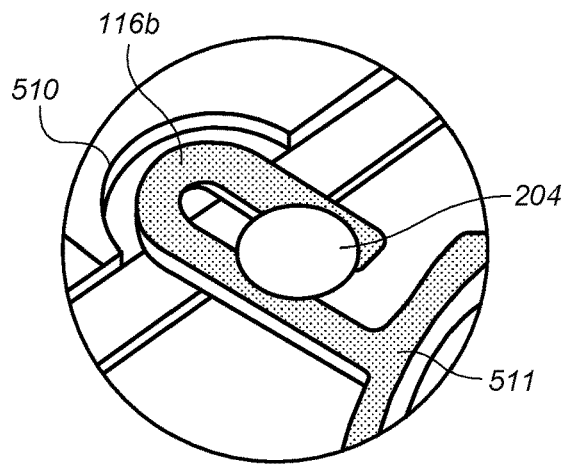
FIGS. 5B-5D illustrate various examples of spring-based resilient members, in some embodiments.
Figure 5C:
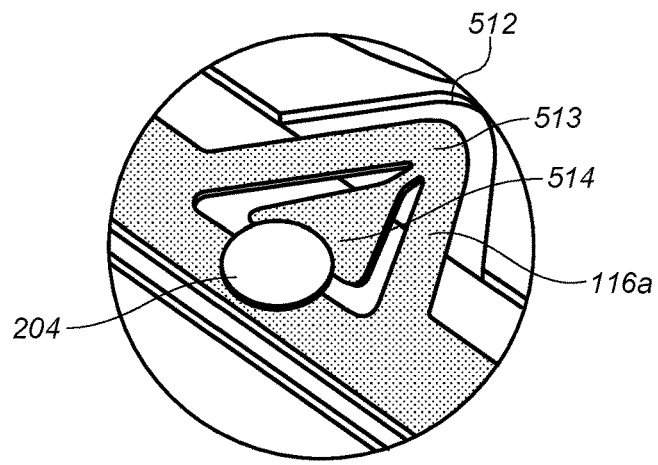
Figure 5D:
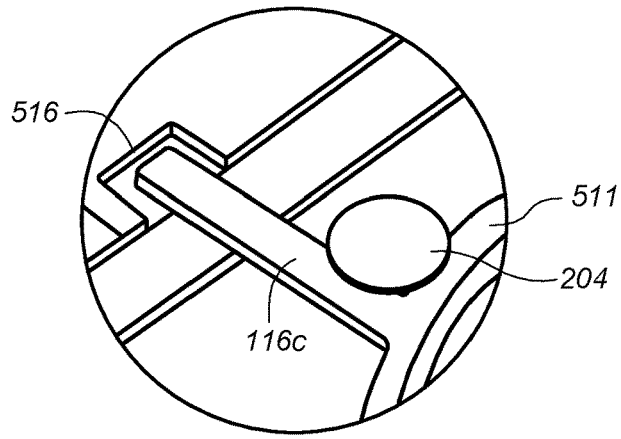

FIGS. 5B-5D illustrate various examples of spring-based resilient members, in some embodiments. FIG. 5B, for example, illustrates an enlarged view of spring tab 116b in FIG. 5A, and FIG. 5C illustrates an enlarged view of spring tab 116a in FIG. 5A. FIG. 5D illustrates a different example of a spring tab, in accordance with some embodiments. It is contemplated that spring tabs of other designs may also be used without departing from the scope of the disclosure.

FIG. 5B illustrates spring tab 116b as a loop-shaped tab that extends from the spring mounting plate 511 (e.g., the spring mounting plate 511 is mounted to the lens carrier 104, in the illustrated embodiment). As depicted, the spring tab 116b extends from the spring mounting plate 511 to a recess 510 and then bends and turns back toward the spring mounting plate 511. In the depicted embodiment, the spring tab stops short of returning all the way back to the spring mounting plate, leaving a gap between the end of the loop and the mounting plate. In other embodiments (not illustrated) the return loop may return all the way back to the spring mounting plate 511. In at least the depicted embodiment, spring tab 116b is illustrated with damping gel 204. The damping gel 204, or other damping mechanism may be placed in various positions within the camera module without departing from the scope of this disclosure.

FIG. 5C illustrates a cantilever-type of spring tab 116a. In the depicted embodiment, the spring tab 116a is mounted to an autofocus yoke component 506. As the lens carrier moves in the +Z direction a recess 512 engages the tip 513 of spring tab 116a and the point 513 of the spring tab 116a increase pressure in the −Z direction as the recess 512 of the lens carrier moves in the +Z direction. In a cantilever design, the tail 514 of the spring tab 116A moves in the opposite direction of the point. As recess 512 moves in the +Z direction, the tip 513 of spring tab 116a is moved in the same +Z direction, while the tail 514 of the spring tab 116a moves in the −Z direction, opposite the direction of the tip 513. In at least the depicted embodiment, damping gel 204 may be affixed to the spring tab 116a. The damping gel is depicted at affixed to the spring tab 116a tail 514, but may be places elsewhere, in other embodiments.

FIG. 5D illustrates another embodiment of a spring tab design. In the depicted embodiment, a single spring tab 116c extends from the mounting plate 511 out towards a recess 516. A damping gel 204 is depicted in the embodiment.

The suspension of the autofocus mechanism support structure is achieved by the use of four corner wires (e.g., 504). Wire 504 acts as a flexure beam capable of bending with relatively low stiffness, thus allowing motion in both optical image stabilization degrees-of-freedom. However, wire 504 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 504 is stiff in directions that require it to change in length, and hence the fixed points at the ends of each wire (eight points in total) will substantially form the vertices of a parallelepiped for all operational positions of the optical image stabilization mechanism.

An autofocus yoke 506 is shown. A basic autofocus voice coil motor configuration of an actuator 108 consists of a single autofocus coil (not shown) proximate to a lens carrier 104, into which the lens 102 is subsequently placed. An autofocus yoke component 506 supports and houses magnets. Each magnet is poled so as to generate a magnetic field, the useful component of which for the autofocus function is orthogonal to the optical axis and orthogonal to the plane of each magnet proximate to the autofocus coil, and where the field for all four magnets are all either directed towards the autofocus coil, or away from it, so that the Lorentz forces from all four magnets act in the same direction along the optical axis. The autofocus yoke 506 acts as the support chassis structure for the autofocus mechanism and actuator 108. The autofocus yoke 506 may include one or more individual pieces that may be fixed relative to each other. For example, autofocus yoke 506 may include an upper portion and a lower portion coupled together in a fixed relationship.

In embodiments with two camera modules, such as shown in FIG. 1B, the two camera modules may employ the same spring tab designs or different spring tab designs. For example, one camera module may employ spring tabs such as shown in FIG. 5B for cushioning in both the +Z and −Z directions, and the other camera module may employ spring tabs as shown in FIG. 5C for cushioning in both the +Z and −Z directions. In other embodiments, both cameras may employ a mixture of different spring tab designs, including, but not limited to, any of the soring tab designs as shown in FIGS. 5A-D. In an embodiment with multiple camera modules, on module may employ, for example, spring tabs as shown in FIG. 5B for cushioning in the +Z direction and spring tabs as shown in FIG. 5C for cushioning in the +Z direction, and a second camera module in the multiple camera module embodiment may employ, for example, spring tabs as shown in FIG. 5C for cushioning in the +Z direction and spring tabs as shown in FIG. 5B for cushioning in the +Z direction.

The locations of the spring tabs may also vary between camera modules in multiple camera module embodiments. For example, one camera module may include spring tabs arranges as shown in FIG. 5A, whereas a second camera module may include spring tabs in different locations, such as in the corners. In some embodiments, yoke 506 may include springs 508 and spring tabs located underneath lens carrier 104, with spring tabs located to engage lens carrier 104 to cushion impact with stops 206 and 210. In some embodiments, springs 508 and spring tabs may be located both above and below lens carrier 104. In embodiments with multiple camera modules, the number and location of springs 508 and spring tabs may vary between camera modules. For example, in one embodiment, one camera module may have springs 508 and spring tabs located below lens carrier 104, whereas a second camera module of the multiple camera module embodiment may have springs 508 and spring tabs located above lens carrier 104. In some embodiments yoke 506 includes spring tabs that are positioned above a top-facing surface of lens carrier 104 and/or spring tabs that are positioned below a bottom-facing surface of lens carrier 104. Lens carrier 104 may additionally, or alternatively, include spring tabs positioned above a top-facing surface of yoke 506 and/or spring tabs that are positioned below a bottom-facing surface of yoke 506.

In some embodiments the spring tabs may be formed as part of the spring member that connects yoke 506 and lens carrier 104. In other embodiment, individual spring tabs may be formed on or otherwise connected to yoke 506 and/or to lens carrier 104. In such an embodiment, the spring member connecting yoke 506 and lens carrier 104 need not be positioned toward a top side of the yoke and lens carrier for a spring tab to be position toward a bottom side of the yoke and lens. A spring tab may be considered to be "connected" to a yoke (or lens carrier) when a portion of the spring tab is fixedly attached to a portion of the yoke or lens carrier. In some embodiments, spring tabs may be connected to yoke 506 and/or lens carrier 104 separately from material for springs 508. In other embodiment, the spring tabs and springs 508 may be formed from a common piece of material attached to both yoke 506 and lens carrier 104.

FIG. 5 illustrates that a camera module may be configured with a number of resilient members in various configurations. For instance, the relationship between spring tab 116b and magnet holder 214 is illustrated and is similar to the relationship illustrated in FIG. 3C and acts to cushion the optical package as the lens approaches the stops in the −Z direction. Also, the relationship between the spring tab 116a and lens carrier 104/optical package 102 illustrated in FIG. 5 is similar to the relationship illustrated in FIG. 3B and acts to cushion the optical package as the optical package approaches stops in the +Z direction.

Multifunction Device Examples

Figure 6:
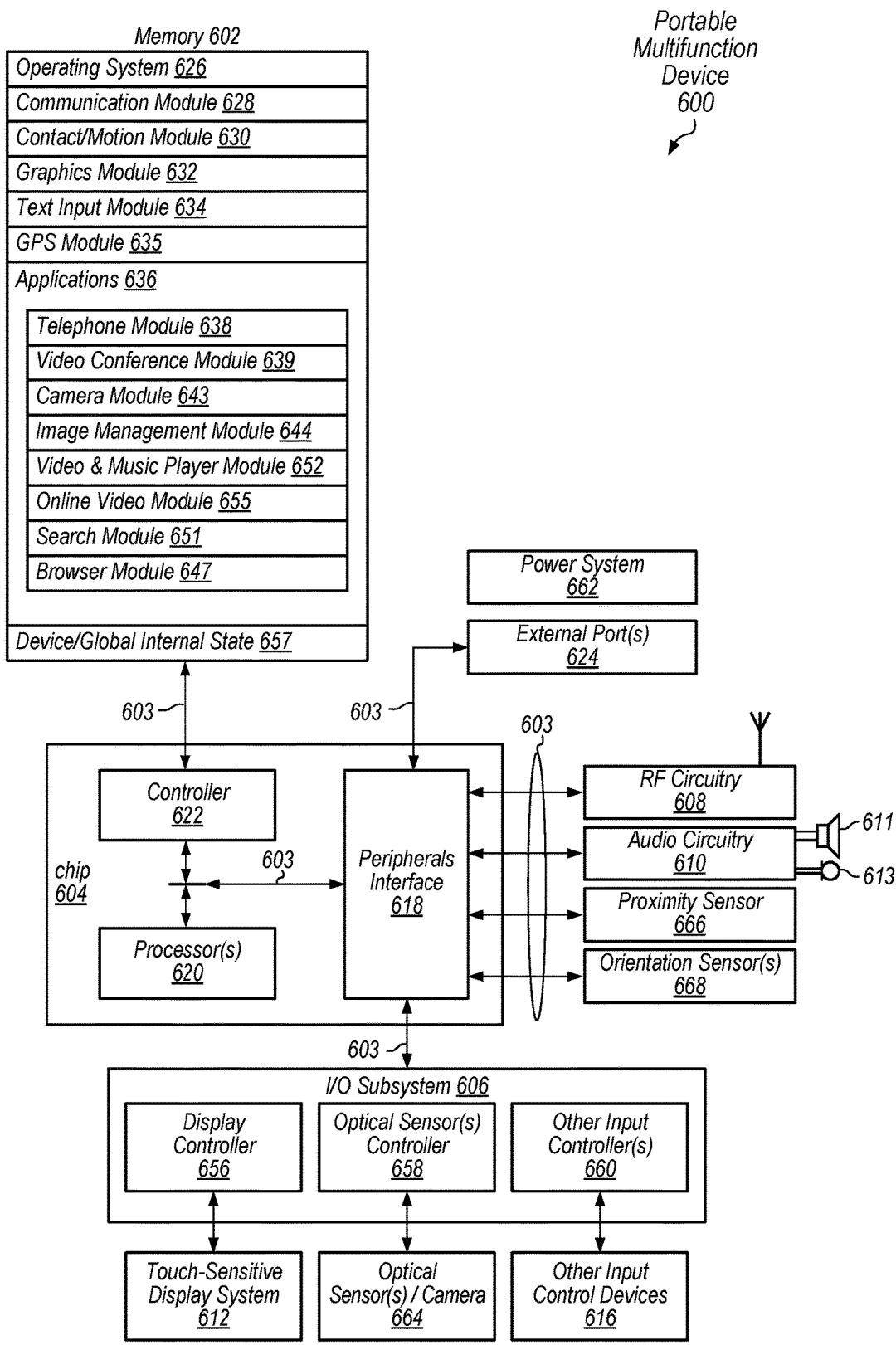
FIG. 6 illustrates functional components of a portable multifunction device that includes a camera module, in accordance with various embodiments.

FIG. 6 illustrates a block diagram of a portable multifunction device in accordance with some embodiments. In some embodiments, the device is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 600 may include memory 602 (which may include one or more computer readable storage mediums), memory controller 622, one or more processing units (CPU's) 620, peripherals interface 618, RF circuitry 608, audio circuitry 610, speaker 611, touch-sensitive display system 612, microphone 613, input/output (I/O) subsystem 606, other input control devices 616, and external port 624. Device 600 may include one or more optical sensors or cameras 664. These components may communicate over one or more communication buses or signal lines 603.

It should be appreciated that device 600 is only one example of a portable multifunction device, and that device 600 may have more or fewer components than shown, may combine two or more components, or may have a different configuration or arrangement of the components. The various components shown in FIG. 11 may be implemented in hardware, software, or a combination of hardware and software, including one or more signal processing and/or application specific integrated circuits.

Memory 602 may include high-speed random access memory and may also include non-volatile memory, such as one or more magnetic disk storage devices, flash memory devices, or other non-volatile solid-state memory devices. Access to memory 602 by other components of device 600, such as CPU 620 and the peripherals interface 618, may be controlled by memory controller 622.

Peripherals interface 618 can be used to couple input and output peripherals of the device to CPU 620 and memory 602. The one or more processors 620 run or execute various software programs and/or sets of instructions stored in memory 602 to perform various functions for device 600 and to process data.

In some embodiments, peripherals interface 618, CPU 620, and memory controller 622 may be implemented on a single chip, such as chip 604. In some other embodiments, they may be implemented on separate chips.

RF (radio frequency) circuitry 608 receives and sends RF signals, also called electromagnetic signals. RF circuitry 608 converts electrical signals to/from electromagnetic signals and communicates with communications networks and other communications devices via the electromagnetic signals. RF circuitry 608 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 608 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 610, speaker 611, and microphone 613 provide an audio interface between a user and device 600. Audio circuitry 610 receives audio data from peripherals interface 618, converts the audio data to an electrical signal, and transmits the electrical signal to speaker 611. Speaker 611 converts the electrical signal to audible sound waves. Audio circuitry 610 also receives electrical signals converted by microphone 613 from sound waves. Audio circuitry 610 converts the electrical signal to audio data and transmits the audio data to peripherals interface 618 for processing. Audio data may be retrieved from and/or transmitted to memory 602 and/or RF circuitry 608 by peripherals interface 618. In some embodiments, audio circuitry 610 also includes a headset jack. The headset jack provides an interface between audio circuitry 610 and removable audio input/output peripherals, such as output-only headphones or a headset with both output (e.g., a headphone for one or both ears) and input (e.g., a microphone).

I/O subsystem 606 couples input/output peripherals on device 600, such as touch screen 612 and other input control devices 616, to peripherals interface 618. I/O subsystem 606 may include display controller 656 and one or more input controllers 660 for other input control devices 616. The one or more input controllers 660 receive/send electrical signals from/to other input control devices 616. The other input control devices 616 may include physical buttons (e.g., push buttons, rocker buttons, etc.), dials, slider switches, joysticks, click wheels, and so forth. In some alternative embodiments, input controller(s) 660 may be coupled to any (or none) of the following: a keyboard, infrared port, USB port, and a pointer device such as a mouse. The one or more buttons may include an up/down button for volume control of speaker 611 and/or microphone 613. The one or more buttons may include a push button.

Touch-sensitive display 612 provides an input interface and an output interface between the device and a user. Display controller 656 receives and/or sends electrical signals from/to touch screen 612. Touch screen 612 displays visual output to the user. The visual output may include graphics, text, icons, video, and any combination thereof (collectively termed "graphics"). In some embodiments, some or all of the visual output may correspond to user-interface objects.

Touch screen 612 has a touch-sensitive surface, sensor or set of sensors that accepts input from the user based on haptic and/or tactile contact. Touch screen 612 and display controller 656 (along with any associated modules and/or sets of instructions in memory 602) detect contact (and any movement or breaking of the contact) on touch screen 612 and converts the detected contact into interaction with user-interface objects (e.g., one or more soft keys, icons, web pages or images) that are displayed on touch screen 612. In an example embodiment, a point of contact between touch screen 612 and the user corresponds to a finger of the user.

Touch screen 612 may use LCD (liquid crystal display) technology, LPD (light emitting polymer display) technology, or LED (light emitting diode) technology, although other display technologies may be used in other embodiments. Touch screen 612 and display controller 656 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 612. In an example embodiment, projected mutual capacitance sensing technology is used, such as that found in the iPhone®, iPod Touch®, and iPad® from Apple Inc. of Cupertino, Calif.

Touch screen 612 may have a video resolution in excess of 100 dpi. In some embodiments, the touch screen has a video resolution of approximately 160 dpi. The user may make contact with touch screen 612 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 612, device 600 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 612 or an extension of the touch-sensitive surface formed by the touch screen.

Device 600 also includes power system 662 for powering the various components. Power system 662 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 600 may also include one or more optical sensors or cameras 664. FIG. 11 shows an optical sensor coupled to optical sensor controller 658 in I/O subsystem 606. Optical sensor 664 may, for example, include charge-coupled device (CCD) or complementary metal-oxide semiconductor (CMOS) phototransistors or photosensors. Optical sensor 664 receives light from the environment, projected through one or more lenses, and converts the light to data representing an image. In conjunction with imaging module 643 (also called a camera module), optical sensor 664 may capture still images and/or video sequences. In some embodiments, at least one optical sensor may be located on the back of device 600, opposite touch screen display 612 on the front of the device. In some embodiments, the touch screen display may be used as a viewfinder for still and/or video image acquisition. In some embodiments, at least one optical sensor may instead or also be located on the front of the device.

Device 600 may also include one or more proximity sensors 666. FIG. 11 shows proximity sensor 666 coupled to peripherals interface 618. Alternatively, proximity sensor 666 may be coupled to input controller 660 in I/O subsystem 606. In some embodiments, the proximity sensor turns off and disables touch screen 612 when the multifunction device is placed near the user's ear (e.g., when the user is making a phone call).

Device 600 may also include one or more orientation sensors 668. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 600. In some embodiments, the one or more orientation sensors include any combination of orientation/rotation sensors. FIG. 11 shows the one or more orientation sensors 668 coupled to peripherals interface 618. Alternatively, the one or more orientation sensors 668 may be coupled to an input controller 660 in I/O subsystem 606. In some embodiments, information is displayed on the touch screen display in a portrait view or a landscape view based on an analysis of data received from the one or more orientation sensors.

In some embodiments, device 600 may also include one or more other sensors (not shown) including but not limited to ambient light sensors and motion detectors. These sensors may be coupled to peripherals interface 618 or, alternatively, may be coupled to an input controller 660 in I/O subsystem 606. For example, in some embodiments, device 600 may include at least one forward-facing (away from the user) and at least one backward-facing (towards the user) light sensors that may be used to collect ambient lighting metrics from the environment of the device 600 for use in video and image capture, processing, and display applications.

In some embodiments, the software components stored in memory 602 include operating system 626, communication module 628, contact/motion module (or set of instructions) 630, graphics module 632, text input module 634, Global Positioning System (GPS) module 635, and applications 636. Furthermore, in some embodiments memory 602 stores device/global internal state 657. Device/global internal state 657 includes one or more of: active application state, indicating which applications, if any, are currently active; display state, indicating what applications, views or other information occupy various regions of touch screen display 612; sensor state, including information obtained from the device's various sensors and input control devices 616; and location information concerning the device's location and/or attitude.

Operating system 626 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 628 facilitates communication with other devices over one or more external ports 624 and also includes various software components for handling data received by RF circuitry 608 and/or external port 624. External port 624 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 630 may detect contact with touch screen 612 (in conjunction with display controller 656) and other touch sensitive devices (e.g., a touchpad or physical click wheel). Contact/motion module 630 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 630 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 630 and display controller 656 detect contact on a touchpad.

Contact/motion module 630 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 632 includes various software components for rendering and displaying graphics on touch screen 612 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 632 stores data representing graphics to be used. Each graphic may be assigned a corresponding code. Graphics module 632 receives, from applications etc., one or more codes specifying graphics to be displayed along with, if necessary, coordinate data and other graphic property data, and then generates screen image data to output to display controller 656.

Text input module 634, which may be a component of graphics module 632, provides soft keyboards for entering text in various applications that need text input.

GPS module 635 determines the location of the device and provides this information for use in various applications (e.g., to telephone module 638 for use in location-based dialing, to camera module 643 as picture/video metadata, and to applications that provide location-based services such as map/navigation applications).

Applications 636 may include one or more of, but are not limited to, the following modules (or sets of instructions), or a subset or superset thereof:
- telephone module 638;
- video conferencing module 639;
- camera module 643 for still and/or video imaging;
- image management module 644;
- browser module 647;
- search module 651;
- video and music player module 652, which may be made up of a video player module and a music player module; and/or
- online video module 655.
- one or more other modules not shown, such as a gaming module.

Examples of other applications 636 that may be stored in memory 602 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 608, audio circuitry 610, speaker 611, microphone 613, touch screen 612, display controller 656, contact module 630, graphics module 632, and text input module 634, telephone module 638 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 608, audio circuitry 610, speaker 611, microphone 613, touch screen 612, display controller 656, optical sensor 664, optical sensor controller 658, contact/motion module 630, graphics module 632, text input module 634, and telephone module 638, videoconferencing module 639 includes executable instructions to initiate, conduct, and terminate a video conference between a user and one or more other participants in accordance with user instructions.

In conjunction with touch screen 612, display controller 656, optical sensor(s) 664, optical sensor controller 658, contact/motion module 630, graphics module 632, and image management module 644, camera module 643 includes executable instructions to capture still images or video (including a video stream) and store them into memory 602, modify characteristics of a still image or video, or delete a still image or video from memory 602.

In conjunction with touch screen 612, display controller 656, contact/motion module 630, graphics module 632, text input module 634, and camera module 643, image management module 644 includes executable instructions to arrange, modify (e.g., edit), or otherwise manipulate, label, delete, present (e.g., in a digital slide show or album), and store still and/or video images.

In conjunction with RF circuitry 608, touch screen 612, display system controller 656, contact/motion module 630, graphics module 632, and text input module 634, browser module 647 includes executable instructions to browse the Internet in accordance with user instructions, including searching, linking to, receiving, and displaying web pages or portions thereof, as well as attachments and other files linked to web pages.

In conjunction with touch screen 612, display system controller 656, contact/motion module 630, graphics module 632, and text input module 634, search module 651 includes executable instructions to search for text, music, sound, image, video, and/or other files in memory 602 that match one or more search criteria (e.g., one or more user-specified search terms) in accordance with user instructions.

In conjunction with touch screen 612, display system controller 656, contact/motion module 630, graphics module 632, audio circuitry 610, speaker 611, RF circuitry 608, and browser module 647, video and music player module 652 includes executable instructions that allow the user to download and play back recorded music and other sound files stored in one or more file formats, such as MP3 or AAC files, and executable instructions to display, present or otherwise play back videos (e.g., on touch screen 612 or on an external, connected display via external port 624). In some embodiments, device 600 may include the functionality of an MP3 player, such as an iPod (trademark of Apple Inc.).

In conjunction with touch screen 612, display system controller 656, contact/motion module 630, graphics module 632, audio circuitry 610, speaker 611, RF circuitry 608, text input module 634, and browser module 647, online video module 655 includes instructions that allow the user to access, browse, receive (e.g., by streaming and/or download), play back (e.g., on the touch screen or on an external, connected display via external port 624), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 602 may store a subset of the modules and data structures identified above. Furthermore, memory 602 may store additional modules and data structures not described above.

In some embodiments, device 600 is a device where operation of a predefined set of functions on the device is performed exclusively through a touch screen and/or a touchpad. By using a touch screen and/or a touchpad as the primary input control device for operation of device 600, the number of physical input control devices (such as push buttons, dials, and the like) on device 600 may be reduced.

The predefined set of functions that may be performed exclusively through a touch screen and/or a touchpad include navigation between user interfaces. In some embodiments, the touchpad, when touched by the user, navigates device 600 to a main, home, or root menu from any user interface that may be displayed on device 600. In such embodiments, the touchpad may be referred to as a "menu button." In some other embodiments, the menu button may be a physical push button or other physical input control device instead of a touchpad.

Figure 7:
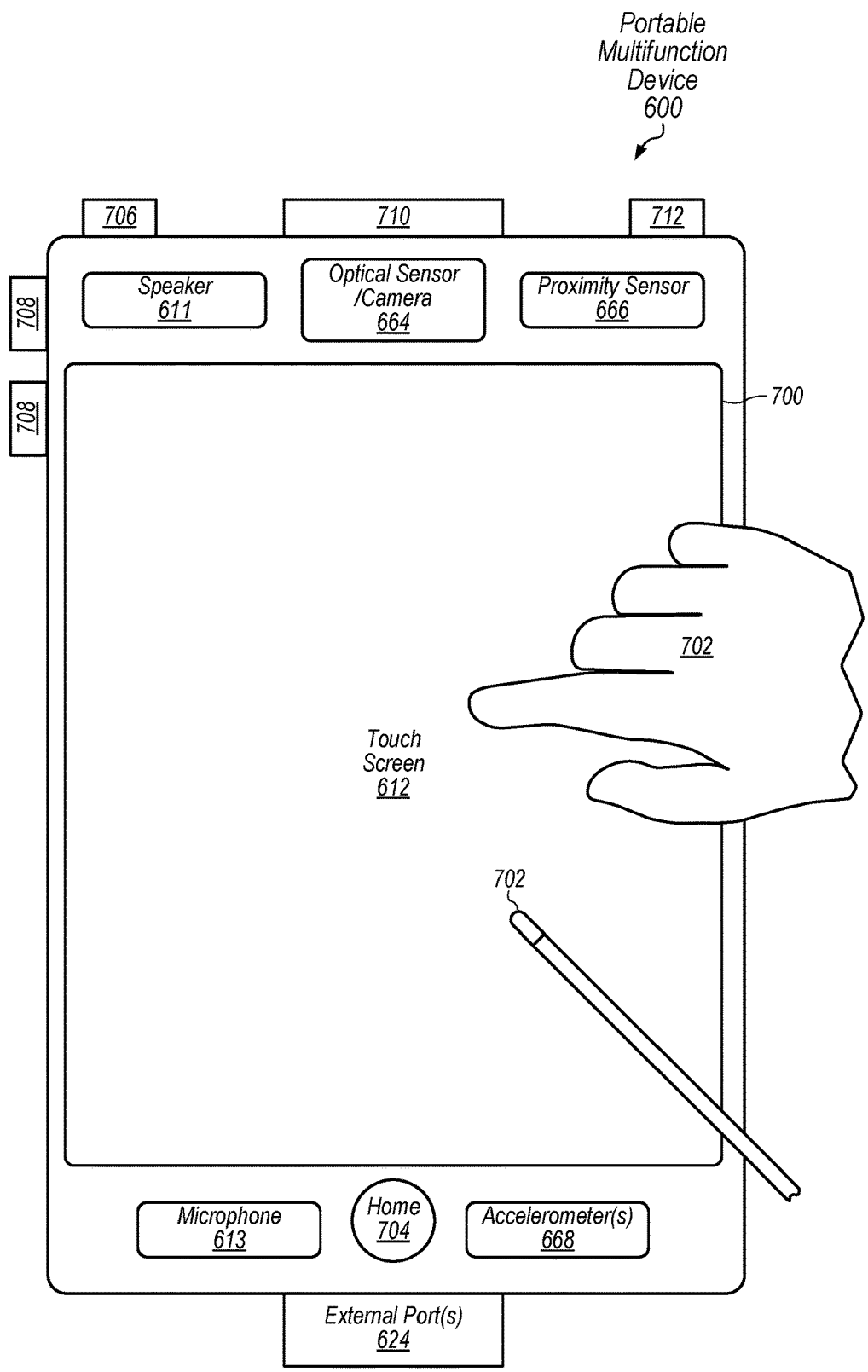
FIG. 7 illustrates a portable multifunction device that includes a camera module, in accordance with various embodiments.

FIG. 7 illustrates a portable multifunction device 600 having a touch screen 612 in accordance with some embodiments. The touch screen may display one or more graphics within user interface (UI) 700. In at least some embodiments of a device 600, a user may select one or more of the graphics by making a gesture on the graphics, for example, with one or more fingers 702 (not drawn necessarily drawn to scale in the figure) or one or more styluses 703 (not necessarily drawn to scale in the figure).

Device 600 may also include one or more physical buttons, such as a "home" or menu button 704. As described previously, menu button 704 may be used to navigate to any application 636 in a set of applications that may be executed on device 600. Alternatively, in some embodiments, the menu button is may be implemented as a soft key in a GUI displayed on touch screen 612.

In one some embodiments, device 600 includes touch screen 612, home or menu button 704, push button 706 for powering the device on/off and locking the device, volume adjustment button(s) 708, Subscriber Identity Module (SIM) card slot 710, head set jack 712, and docking/charging external port 624. Push button 706 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 600 also may accept verbal input for activation or deactivation of some functions through microphone 613.

Device 600 may also include one or more cameras 664. A camera 664 may, for example, include charge-coupled device (CCD) or complementary metal-oxide semiconductor (CMOS) phototransistors or photosensors. A camera 664 receives light from the environment, projected through one or more lenses, and converts the light to data representing an image or video frame. In some embodiments, at least one camera 664 may be located on the back of device 600, opposite touch screen display 612 on the front of the device. In some embodiments, at least one camera 664 may instead or also be located on the front of the device with the touch screen display 612, for example so that the user's image may be obtained for videoconferencing while the user views the other video conference participants on the touch screen display 612. In some embodiments, at least one camera 664 may be located on the front of the device 600, and at least one camera 664 may be located on the back of the device 600. In some embodiments, the touch screen display 612 may be used as a viewfinder and/or user interface for still image and/or video sequence acquisition applications.

Device 600 may include video and image processing hardware and/or software, including but not limited to video encoding and/or decoding components, codecs, modules, or pipelines, that may be used to capture, process, convert, compress, decompress, store, modify, transmit, display, and otherwise manage and manipulate still images and/or video frames or video sequences captured via camera 664 or otherwise acquired (e.g., via a network interface). In some embodiments, device 600 may also include one or more light or other sensors that may be used to collect ambient lighting or other metrics from the environment of the device 600 for use in video and image capture, processing, and display.

Those skilled in the art will appreciate that portable multifunction device 600 is merely illustrative and is not intended to limit the scope of embodiments. In particular, the portable multifunction device and camera devices may include any combination of hardware or software that can perform the indicated functions, including computers, network devices, Internet appliances, PDAs, wireless phones, pagers, etc. Portable multifunction device 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A multifunction device, comprising:
a central processing unit;
a memory coupled to the central processing unit; and
a camera module coupled to the central processing unit, wherein the memory stores program instructions executable by the central processing unit to control operation of the camera module, wherein the camera module comprises:
a camera subassembly;
an image sensor, attached to the camera subassembly;
an optical package;
one or more end stops;
a magnetic camera actuator for moving the optical package relative to the image sensor; and
one or more resilient members that restrict movement of the optical package before the optical package reaches an end stop of the one or more end stops, the one or more resilient members configured to cushion movement of the optical package as the optical package approaches the one or more end stops.

2. The multifunction device of claim 1, wherein a stiffness of the one or more resilient members is sufficient to cushion the movement of the optical package with respect to the one or more end stops when an applied force is less than a threshold.

3. The multifunction device of claim 2, wherein a flexibility of the one or more resilient members is sufficient to give way and allow engagement with one or more ends stops of the camera subassembly when the applied force is greater than a threshold.

4. The multifunction device of claim 1, wherein the one or more end stops define a range of movement of the optical package with respect to the camera subassembly, and wherein the one or more resilient members restrict movement of the optical package past the end of an operational range of motion controlled by the magnetic camera actuator.

5. The multifunction device of claim 1,
wherein one or more resilient members are mounted on the camera subassembly and engage with the optical package to cushion the movement of the optical package with respect to the camera subassembly, and
wherein one or more resilient members are mounted on the optical package and engage with the camera subassembly to cushion the movement of the optical package with respect to the camera subassembly.

6. The multifunction device of claim 1, further comprising a spring-based suspension system that suspends the optical package within the camera subassembly, wherein the spring-based suspension system includes the one or more resilient members.

7. The multifunction device of claim 1, further comprising a plurality of resilient members, wherein additional ones of a plurality of resilient members are arranged to engage and provide additional amounts of cushioning as the optical package continues past engagement of the one or more resilient members.

8. A camera, comprising:
a camera subassembly;
an image sensor attached to the camera subassembly;
an optical package;

one or more end stops;
a magnetic camera actuator for moving the optical package relative to the image sensor; and
one or more resilient members that engage the optical package before the optical package reaches an end stop of the one or more end stops, the one or more resilient members configured to cushion movement of the optical package as the optical package approaches the one or more end stops.

9. The camera of claim 8, wherein a stiffness of the one or more resilient members is sufficient to cushion the movement of the optical package with respect to the camera subassembly when an applied force is less than a threshold, and a flexibility of the one or more resilient members is sufficient to give way and allow engagement with one or more end stops of the camera subassembly when the applied force is greater than a threshold.

10. The camera of claim 8, further comprising one or more additional resilient members, wherein the one or more resilient members are configured to cushion movement of the optical package along an axis, and wherein the one or more additional resilient members are configured to cushion movement of the optical package along another distinct axis.

11. The camera of claim 8, further comprising a damping gel, wherein a portion of one or more of the resilient members is suspended in the damping gel to dampen oscillation of the one or more resilient members.

12. The camera of claim 8, further comprising one or more magnet holders, wherein the one or more magnet holders are part of the camera actuator, and wherein the one or more magnet holders of the camera actuator form end stops that define the end stops for movement of the optical package with respect to the camera subassembly.

13. The camera of claim 12, further comprising a shield can, wherein the one or more resilient members are disposed between the one or more magnet holders and the shield can.

14. The camera of claim 8, wherein the one or more end stops define a range of movement of the optical package with respect to the camera subassembly, and wherein the one or more resilient members engage with the optical package past the end of an operational range of motion of the magnetic camera actuator.

15. A camera module, comprising:
an optical package;
a camera subassembly configured to support the optical package;
one or more end stops;
a magnetic camera actuator for moving the optical package relative to the camera subassembly; and
one or more resilient members that restrict movement of the optical package before the optical package reaches the one or more end stops, the one or more resilient members configured to cushion movement of the optical package as the optical package approaches the one or more end stops.

16. The camera module of claim 15, wherein the one or more end stops comprise one or more elastomeric pad bumpers that protrude from the end stops of the camera subassembly or the optical package.

17. The camera module of claim 16, wherein the one or more bumpers are proud of the end stops of the camera subassembly prior to engagement of the optical package to the one or more bumpers.

18. The camera module of claim 15, further comprising:
one or more resilient members mounted on either the camera subassembly or the optical package that engage with the other of the camera subassembly or the optical package to cushion the movement of the optical package with respect to the camera subassembly as movement of the optical package approaches the camera subassembly.

19. The camera module of claim 18, wherein the one or more resilient members are mounted to cushion movement of the optical package along an axis, and wherein the one or more resilient members are mounted to cushion movement of the optical package along another distinct axis.

20. The camera module of claim 19, wherein the one or more resilient members are configured to deform and allow hard contact between the optical package and the camera subassembly during drops, manufacture or calibration of the camera.

* * * * *